Patented Feb. 25, 1936

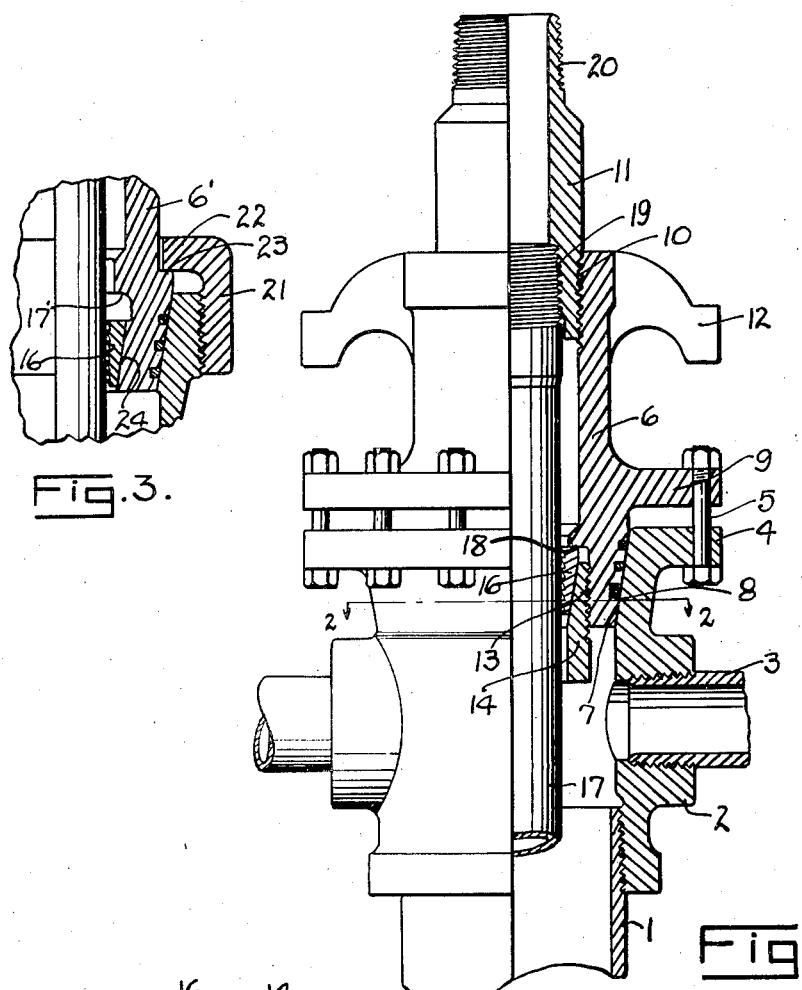

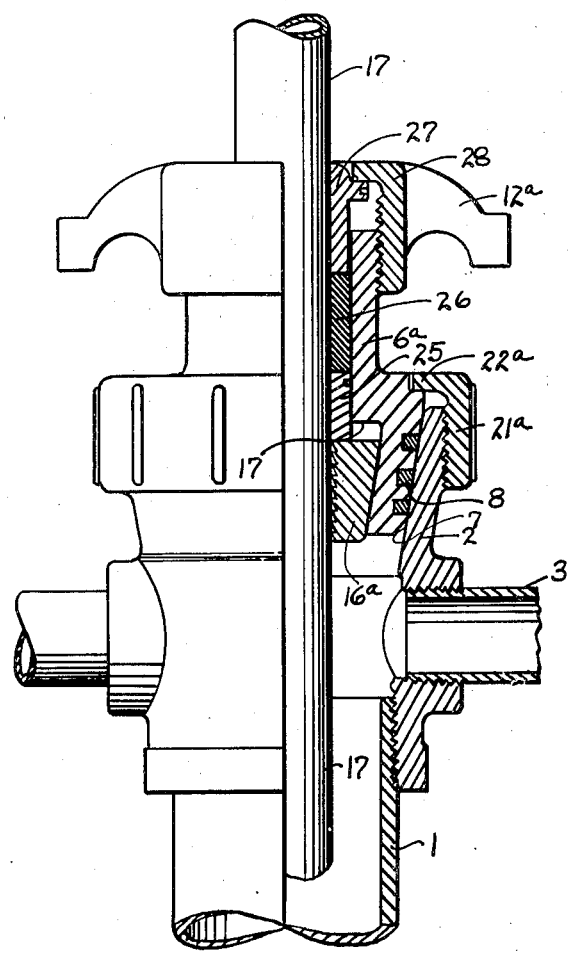
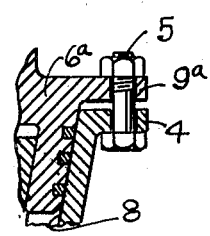
Fig. 4.
Fig. 5.

2,031,654

UNITED STATES PATENT OFFICE 2,031,654

TUBING SUPPORT

James H. Howard, Houston, Tex., assignor to J. H. McEvoy & Company, Sherman, Tex., a corporation Application June 5, 1933, Serial No. 674,376

2 Claims. (Cl. 166—14)

My invention relates to an attachment for casing heads for the support of well tubing.

In cases where the tubing is supported in a stationary manner in the casing head it is a common difficulty that the swaying of the tubing in the well during the pumping operations tends to break the pipe adjacent its point of attachment where it is threaded into a stationary support. Steps have previously been taken to support the tubing at a plurality of points whereby the fatigue and fracture of the tubing adjacent the couplings may be avoided.

It is an object of my invention to provide a support for the tubing adjacent its upper end which may be conveniently placed in position and may be thereafter readily removed.

It is also an object of the invention to provide a support which may be placed in a detachable head or bushing which has a fluid-tight engagement in the casing head.

I further desire to provide a plurality of supports for the upper end of the tubing which may be formed in a removable member detachably secured in the casing head. My invention resides particularly in the arrangement and location of the supporting members which make up the tubing supporting attachment for the casing head, all of which will be more clearly understood from the drawings herewith.

With reference to the drawings, Fig. 1 is a side view partly in elevation and partly in central vertical section showing one embodiment of my invention.

Fig. 2 is a transverse section taken on the plane 2—2 of Fig. 1.

Fig. 3 is a broken sectional detail showing another embodiment of the manner in which the support may be secured in the casing head.

Fig. 4 is a side view similar to that shown in Fig. 1, but illustrating a different embodiment of the supporting structure.

Fig. 5 is a broken sectional detail showing another method by which the bushing in Fig. 4 may be secured to the casing head.

I have shown a casing 1, having at the upper end thereof a casing head 2 of common construction. Said casing head has a plurality of lateral outlets 3 through which fluid may pass to or from the casing. The upper end of the casing head has a radially extending flange 4, having openings therethrough to receive bolts 5 by means of which the bushing 6 may be clamped thereto. The interior of the upper end of the casing head has a tapered seat indicated at 7.

The bushing 6 has its lower end tapered downwardly to fit within the seat 7 and said tapered area has a plurality of packing rings 8 set therein to form a seal with the seat when the said bushing is engaged therein. Above the tapered area said bushing has a flange 9 thereon through which the bolts 5 may engage to clamp the bushing in position on the casing head. Said bushing is tubular in shape and extends upwardly above the casing head and is threaded internally at 10 to engage with a special coupling 11 in the flow line. I have shown oppositely projecting arms 12 on the bushing whereby the same may be engaged by an elevator or other means through which it is moved to and from its position in the casing head.

On the interior of the lower end of the bushing I form a threaded area 13 into which I may engage a supporting sleeve 14. Said sleeve has its upper portion flared on the inner side to form a downwardly tapered seat 15 to receive slips or dogs 16 adapted to engage with inner tubing 17. Above the threaded portion 13 of the bushing is an inwardly projecting flange having a shoulder 18 on the under side which is adapted to engage the upper ends of the slips 16 and limit the upward movement. Thus, when the sleeve 14 is screwed upwardly into the bushing it will force the slip 16 against the pipe or tubing 17 and act as a support therefor.

The special coupling 11 which is adapted to be supported at the upper end of the bushing acts as a connection between the tubing and the flow line above the casing. It is threaded internally at 19 to engage with the tubing section 17 at its upper end and is externally threaded at 20 to engage with the flow line not shown.

It will thus be seen that the tubing 17 has a supporting connection with the coupling 11 which is in turn connected with the upper end of the bushing 6. Under ordinary conditions the tendency would be for this connection to break off adjacent the lower threads at the upper end of the tubing section. By supporting the tubing again by means of the slips 16 it will be obvious that the sway of the pipe in the well will not be communicated to the threaded connection at 9 but will be taken up by the support given to the tubing by the slips 16. This lower support is formed at a point where the bushing 6 seats within the casing head and is a particularly reliable form of support.

It will be noted that the tubing may be connected to the bushing 6 both at 19 and 16 before the bushing 6 is lowered into the casing head. Furthermore, the attachment of the lower support can be easily accomplished by the insertion of an assembly 14 and 16 upwardly into the lower end of the bushing as will be obvious.

In Fig. 3, I have shown a slight modification of the structure disclosed in Fig. 1. Instead of securing the bushing 6' to the casing head by bolting the flanges of the two parts together I have shown a threaded ring 21 which may be screwed over the upper end of the casing head, said ring having an inwardly extending flange 22 which may engage upon a shoulder 23 on the bushing.

Furthermore, the inner seat 24 for the slips 16 is formed integral with the inner face of the bushing and the shoulder 17' is spaced upwardly away from the upper end of the slips 16. In this embodiment the slips must be fitted in position when the bushing is inserted downwardly over the upper end of the tubing. During this operation the slips may move upwardly in the seat but when the tubing has been properly positioned the slips will drop downwardly in the seat 24 and engage with the tubing.

In Fig. 4 is a still different embodiment of the invention where the bushing 6a is formed at its lower end for engagement with the casing head 2 in the same manner as was disclosed in Fig. 3. The ring 21a is screwed over the upper end of the casing head and an inner flange 22a engages upon the shoulder on the bushing to hold said bushing tightly into the seat 7. The slips 16a are held downwardly in the seat in the bushing by means of a ring 25 acting as a support for the packing ring 26 for a stuffing box around the tubing 17. There is a gland 27 bearing upon the packing member 26 and adapted to be tightened into position by a cap 28 screwed over the upper end of the bushing. Cap 28 has laterally extended arms 12a formed thereon whereby the bushing may be handled in the same maner as in the first embodiment.

It will be noted from Fig. 5 that the bushing 6a can be formed with the lateral flange 9a thereon to engage with the flange 4 on a casing head as in the embodiment shown in Fig. 1. I wish it understood therefore that I do not wish to be confined to the use of any particular means for securing the bushing in operative position in the casing head.

In all my embodiments of the invention it will be seen that there is a detachable support for the tubing at a point directly on a level with the upper end of the casing head. There is a substantial support formed at this point which tends to hold the tubing against dropping in case of emergency. In the Fig. 4 embodiment the tubing is not directly connected with the bushing but is supported for a portion of its length by the particular construction of the stuffing box formed in the upper end of the bushing. The particular arrangement of the tubing support has many advantages which will be obvious to those skilled in the art.

What is claimed is:

1. A well tubing, a support therefor including a well casing, a casing head thereon having a downwardly tapered seat, a bushing shaped to fit and form a seal in said seat, a sleeve removably secured in the lower end of said bushing, a downwardly tapered slip seat in said sleeve, slips in said slip seat adapted to engage said tubing, said sleeve being adjustable in said bushing, and means at the upper end of said bushing to engage and assist in supporting said tubing.

2. A casing head having a seat therein for supporting a tubing, a bushing to fit said seat and projecting above said casing head, means to clamp said bushing in said seat, a slip seat in said bushing adjacent the lower end thereof, slips in said slip seat engaging said tubing in said bushing, said slip seat being adjustable and detachable from said bushing.

JAMES H. HOWARD.